(12) United States Patent
Schulze-Isfort et al.

(10) Patent No.: US 8,834,833 B2
(45) Date of Patent: Sep. 16, 2014

(54) PROCESS FOR PREPARING AN ALUMINIUM OXIDE POWDER HAVING A HIGH ALPHA-AL$_2$O$_3$ CONTENT

(75) Inventors: Christian Schulze-Isfort, Limeshain (DE); Christoph Batz-Sohn, Hanau-Mittelbuchen (DE); Herbert Habermann, Biebergemuend (DE); Ralph Hofmann, Buchen (DE)

(73) Assignee: Evonik Degussa GmbH, Essen (DE)

( * ) Notice: Subject to any disclaimer, the term of this patent is extended or adjusted under 35 U.S.C. 154(b) by 74 days.

(21) Appl. No.: 13/129,070

(22) PCT Filed: Nov. 17, 2009

(86) PCT No.: PCT/EP2009/065272
§ 371 (c)(1),
(2), (4) Date: May 12, 2011

(87) PCT Pub. No.: WO2005/061385
PCT Pub. Date: Jul. 7, 2005

(65) Prior Publication Data
US 2011/0217552 A1 Sep. 8, 2011

(30) Foreign Application Priority Data
Dec. 17, 2008 (EP) .................................. 08171996

(51) Int. Cl.
*C01F 7/02* (2006.01)
*C04B 35/10* (2006.01)
*B32B 5/16* (2006.01)

(52) U.S. Cl.
USPC .......................... 423/625; 428/402; 501/127

(58) Field of Classification Search
USPC ............................ 428/402; 501/127; 423/625
See application file for complete search history.

(56) References Cited

U.S. PATENT DOCUMENTS 4,159,313 A * 6/1979 Mercier et al. ................ 423/625
4,797,270 A * 1/1989 Alvarado Cendan et al. 423/625
(Continued)

FOREIGN PATENT DOCUMENTS

CN        1538936 A     10/2004
WO        92 16595      10/1992
WO        2005 061385   7/2005

OTHER PUBLICATIONS

International Search Report issued Mar. 4, 2010 in PCT/EP09/65272 filed Nov. 17, 2009.

(Continued)

Primary Examiner — Holly Le
(74) Attorney, Agent, or Firm — Oblon, Spivak, McClelland, Maier & Neustadt, L.L.P.

(57) ABSTRACT

Process for preparing an aluminum oxide powder which is present in the form of aggregated primary particles and comprises at least 85% by weight of alpha-aluminum oxide, in which an aluminum oxide powder which a) is present in the form of aggregated primary particles, b) is selected from the group consisting of gamma-aluminum oxide, theta-aluminum oxide, delta-aluminum oxide and/or X-ray amorphous aluminum oxide, and c) has a tamped density of at least 250 g/l, is subject to a heat treatment at 13000 C or more and subsequently milled. Aluminum oxide powder which can be obtained by this process. Aluminum oxide powder in the form of aggregated primary particles having a BET surface area of from 3 to 30 m2/g, in which the proportion of alpha-aluminum oxide is at least 85% by weight and the ratio dgo/dio of the weight distribution of the primary particles is at least 2.8. Use as constituent of fluorescent tubes.

9 Claims, 2 Drawing Sheets

(56) References Cited

U.S. PATENT DOCUMENTS

Figure 1:
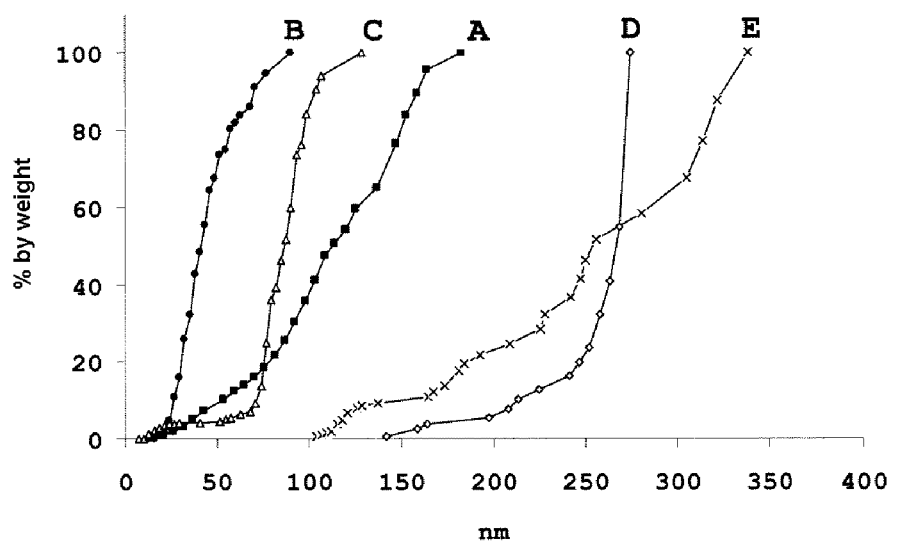

| | | | |
|---|---|---|---|
| 5,302,368 A * | 4/1994 | Harato et al. | 423/625 |
| 6,680,109 B1 * | 1/2004 | Plambeck-Fischer et al. | 428/323 |
| 7,361,714 B2 | 4/2008 | Grass et al. | |
| 8,197,791 B2 * | 6/2012 | Schumacher et al. | 423/625 |
| 2003/0119655 A1 * | 6/2003 | Meyer et al. | 501/127 |
| 2005/0008565 A1 * | 1/2005 | Maki et al. | 423/625 |
| 2006/0041167 A1 | 2/2006 | Grass et al. | |
| 2006/0104895 A1 * | 5/2006 | Bauer et al. | 423/625 |
| 2007/0111880 A1 | 5/2007 | Schumacher et al. | |
| 2007/0154386 A1 | 7/2007 | Yen et al. | |
| 2008/0058572 A1 | 3/2008 | Fernandez et al. | |
| 2008/0231161 A1 * | 9/2008 | Sigai et al. | 313/486 |

OTHER PUBLICATIONS

Search Report issued Mar. 11, 2013 in Taiwanese Patent Application No. 098142710.

* cited by examiner

PROCESS FOR PREPARING AN ALUMINIUM OXIDE POWDER HAVING A HIGH ALPHA-AL₂O₃ CONTENT

The invention relates to a process for preparing an aluminium oxide powder which has a high proportion of the alpha phase. The invention also relates to an aluminium oxide powder which can be obtained by this process and its use. Furthermore, the invention relates to a fluorescent lamp containing this aluminium oxide powder.

Alpha-aluminium oxide is widely used, for example as abrasive, in engineering ceramics and as catalyst support. A further field of application is fluorescent tubes. Between phosphor and glass tube there is a protective layer of aluminium oxide. This firstly reflects UV radiation which is not absorbed by the phosphor and, secondly, it prevents the diffusion of mercury and thus greying of the glass. In addition, it ensures better adhesion of the phosphor to the glass. In U.S. Pat. No. 5,552,665, gamma-aluminium oxide is used for this purpose, while in U.S. Pat. No. 5,602,444, a mixture of gamma- and alpha-aluminium oxide is used.

The preparation of alpha-aluminium oxide is usually carried out by means of the Bayer process in which bauxite is converted into aluminium hydroxide or transition aluminium oxides ("transition alumina"). In addition, there are also hydrothermal processes.

On going from aluminium hydroxide via the transition aluminium oxides to alpha-aluminium oxide, the structure changes very little. This leads to, for example, the transition metal oxides having very high internal porosities and reaching specific BET surface areas of up to several hundred square meters per gram.

WO92/16595 discloses a process in which aluminium oxide obtainable from the Bayer process is compacted to form pressed bodies having a diameter of from 1 to 3 mm and is subsequently heat treated. Furthermore, the compacted aluminium hydroxide can firstly be converted into gamma-aluminium oxide and this can be converted in a separate step into alpha-aluminium oxide. The gamma-aluminium oxide is, as indicated above, a material having a BET surface area of typically from 200 to 250 m²/g. The alpha-aluminium oxide which can be obtained by means of this process has a narrow particle size distribution and is suitable as abrasive.

Furthermore, attempts have been made to prepare alpha-aluminium oxide by transformation of pyrogenic aluminium oxides or by a pyrogenic process itself. Owing to the good availability and high purity of pyrogenic aluminium oxides, these should be ideal starting materials for the preparation of alpha-aluminium oxide.

EP-A-355481 discloses a process in which gamma-aluminium oxide prepared by a pyrogenic route is thermally treated in an oxygen/hydrogen flame. Although powders enriched with alpha-aluminium oxide can be obtained, contents of more than 70% by weight of alpha-aluminium oxide cannot be achieved.

EP-A-395925 discloses a process in which aluminium oxide powder having an alpha content of from 20 to 80% by weight can be obtained directly from aluminium trichloride in an oxygen/hydrogen flame. Here too, higher proportions of alpha-aluminium oxide cannot be achieved.

Both processes give a material whose structure and composition is unsuitable for further processing.

It was an object of the present invention to provide a process which leads to aluminium oxide having a high alpha content.

A further object of the invention was to provide an aluminium oxide powder which, compared to the prior art, has improved properties in the coating of substrates.

The present invention provides a process for preparing an aluminium oxide powder which is present in the form of aggregated primary particles and comprises at least 85% by weight of alpha-aluminium oxide, in which an aluminium oxide powder which
  a) is present in the form of aggregated primary particles,
  b) is selected from the group consisting of
    gamma-aluminium oxide,
    theta-aluminium oxide,
    delta-aluminium oxide and/or
    X-ray amorphous aluminium oxide, and
  c) has a tamped density of at least 250 g/l, is subject to a heat treatment at 1300° C. or more and subsequently milled.

The aluminium oxide content of the powder obtained in this way is preferably at least 99.8% by weight, particularly preferably at least 99.9% by weight. The proportion of silicon dioxide in the powder obtained is, in a particular embodiment, less than 0.1% by weight, particularly preferably less than 0.01% by weight.

The average aggregate diameter of the powder obtained is preferably from 100 nm to 1 μm, particularly preferably from 100 to 500 nm.

The process of the invention also allows the preparation of an aluminium oxide powder having a proportion of the alpha modification of at least 95% by weight. It is likewise possible to prepare a powder which consists entirely of alpha-aluminium oxide.

The alpha content is determined by X-ray structure analysis in comparison with powder mixtures having a defined composition of alpha-aluminium oxide and the abovementioned crystal modifications. Apart from alpha-aluminium oxide, the process product can contain minor fractions of the gamma, theta, delta crystal modifications and amorphous constituents, with the gamma crystal modification generally being the main component of the minor fractions.

The BET surface area of the aluminium oxide powder used is not critical. In general, the BET surface areas are from 30 to 250 m²/g. It can preferably be from 50 to 140 m²/g.

It is particularly advantageous to use pyrogenic aluminium oxide powders. In general, the gamma modification is the main constituent of pyrogenic aluminium oxides. However, it is also possible to prepare pyrogenic aluminium oxide powders in which delta and theta phases predominate.

Finally, X-ray amorphous aluminium oxides can also be used. Such an aluminium oxide is disclosed, for example, in WO 2005061385. It has a BET surface area of more than 130 m²/g, has crystalline primary particles which can be detected by means of TEM but is nevertheless X-ray amorphous. For the present purposes, X-ray amorphous means an intensity in the X-ray diffraction pattern, expressed as counts, at a 2 theta angle of 67° of less than 50.

The alpha modification is not detectable by means of X-ray diffractometry in the pyrogenic aluminium oxide powders which are preferably used.

For the purposes of the present invention, pyrogenic refers to processes of flame hydrolysis and flame oxidation. Here, aluminium compounds, generally aluminium chloride, are hydrolysed and/or oxidized at high temperatures to form aluminium oxide. Commercially available aluminium oxide powders are, for example, SpectrAl™ 51, SpectrAl™ 81, SpectrAl™ 100, from Cabot, AEROXIDE® Alu 65, AEROXIDE® Alu C, from Evonik Degussa.

Pyrogenic aluminium oxide powders have a very high purity. Due to the production process, the primary particles have a compact, approximately spherical shape and are largely free of internal pores.

It is important for the purposes of the invention that the aluminium oxide used has a tamped density of at least 250 g/l. The aluminium oxide preferably has a tamped density of from 250 to 2000 g/l. Particular preference is given to a tamped density of from 300 to 800 g/l. The tamper densities specified in the invention are determined in accordance with DIN EN ISO 787-11.

In the case of aluminium oxide powders, in particular pyrogenic aluminium oxide powders, which have a lower tamped density, methods of increasing the tamped density are available.

Thus, spray-dried granulated pyrogenic aluminium oxide materials having a tamped density of from 400 to 1200 g/l can be obtained by dispersing a pyrogenic aluminium oxide powder, for example SpectrAl™ 51, SpectrAl™ 81, SpectrAl™ 100, AEROXIDE® Alu 65 or AEROXIDE® Alu C, in water, spray drying the dispersion and, if appropriate, heat treating the granulated materials obtained at a temperature of from 150 to 1100° C. for a period of from 1 to 8 hours. This process is disclosed in EP-A-1414747. The average particle diameter of the spray-dried granulated materials can preferably be from 8 to 150 µm.

The best results are achieved using pressed granulated materials which are present in the form of broken flakes. The pressed granulated materials can be obtained by compaction, crushing and classification of aluminium oxide powder. The aluminium oxide powder used for this purpose generally has a tamped density of from about 30 to 150 g/l.

For the present purposes, compaction is mechanical densification without addition of binders. Uniform pressing of the aluminium oxide powder should be ensured during compaction in order to obtain flakes having a largely homogeneous density.

The compaction to form flakes can be carried out by means of two rollers of which one or both can at the same time have a deaeration function.

Preference is given to using two compacting rollers which can be smooth or profiled. The profile can be present either on only one compacting roller or on both compacting rollers. The profile can comprise grooves parallel to the axis or depressions arranged in any way and of any configuration. In a further embodiment of the invention, at least one of the rollers can be a vacuum roller.

A particularly suitable compaction process is a process in which the aluminium oxide powder to be compacted is compacted by means of two densification rollers of which at least one can be driven so as to rotate and which apply a specific pressing pressure of from 0.25 kN/cm to 50 kN/cm, with the surface of the densification rollers consisting of a material which is substantially or completely free of metals and/or metal compounds, or the surface consisting of a very hard material. Suitable materials are engineering ceramics such as silicon carbide, silicon nitride, coated metals or aluminium oxide.

After compaction, the flakes are crushed. A sieve granulator which predetermines the particle size by means of the mesh opening of the sieve can be used for this purpose. The mesh opening can be from 250 µm to 20 mm.

The fragments of the flakes can subsequently be classified by means of a sifter, a sieve or a classifier. The fragments of the flakes usually have an average particle diameter determined by means of sieve analysis of from 200 to 1500 µm. The average particle diameter can preferably be from 300 to 800 µm. The tamped density of the pressed granulated materials is preferably from 250 to 2000 g/l and particularly preferably from 300 to 800 g/l.

The fines (particles smaller than 200 µm) can be separated off. As sifters, it is possible to use crossflow sifters, countercurrent deflection sifters, etc. As classifier, it is possible to use a cyclone. The fines (particles smaller than 200 µm) separated off during classification can be recirculated to the process of the invention.

Finally, the aluminium oxide powder having a tamped density of at least 250 g/l, preferably a pressed granulated material having a tamped density of from 300 to 800 g/l, is heat treated. The heat treatment, which can be carried out continuously or batchwise, is preferably carried out at from 1300 to 1500° C. The average residence time can be from 1 minute to 24 hours, preferably from 10 to 80 minutes. Variation of temperature and residence time enables the content of alpha modification, the structure and the BET surface area to be varied.

The BET surface area of the heat-treated granulated materials can be from 3 to 30 m$^2$/g, with values of from 6 to 20 m$^2$/g being preferred.

The heat treatment is preferably carried out in a rotary tube furnace which is supplied continuously. The throughput can be varied via the dimensions of the rotary tube furnace. It is usually from 1 to 100 kg/h.

The heat treatment of the granulated materials is an important step of the process of the invention. The use of an aluminium oxide powder whose tamped density is less than 250 g/l instead of a granulated material leads to a strongly sintered product which still has high proportions of transition aluminium oxides. Furthermore, the use of aluminium oxide powders does not allow continuous heat treatment, for example in a rotary tube furnace, since caking occurs and prevents a continuous process.

Furthermore, the process of the invention comprises a milling step which can, for example, be in the form of dry milling. Dry milling can in principle be carried out using the methods known to those skilled in the art. Examples which may be mentioned are an air jet, steam jet, impact or pin mill.

The average particle diameter of the aluminium oxide particles obtained in this way is from 0.1 µm to 1 µm. Their BET surface area corresponds essentially to that of the heat-treated granulated materials used, namely from 3 to 30 m$^2$/g, preferably from 6 to 20 m$^2$/g.

Apart from dry milling, wet milling is also possible, giving a dispersion of aluminium oxide particles. The particles obtained after heat treatment and, if appropriate, after dry milling are for this purpose dispersed in a solvent by means of apparatuses known to those skilled in the art. Examples which may be mentioned are ball mills, roll mills, rotor-stator machines and high-pressure milling.

The invention further provides an aluminium oxide powder which can be obtained by the process of the invention.

The invention further provides an aluminium oxide powder in the form of aggregated primary particles having a BET surface area of from 3 to 30 m$^2$/g, preferably from 6 to 20 m$^2$/g, in which the proportion of alpha-aluminium oxide is at least 85% by weight and the ratio $d_{90}/d_{10}$ of the weight distribution of the primary particles is at least 2.8.

In a preferred embodiment, the ratio $d_{90}/d_{10}$ is from 2.8 to 3.5. Particular preference is given to a $d_{90}/d_{10}$ ratio of from 2.9 to 3.2.

It has been found that a dispersion containing an aluminium oxide powder having these properties is particularly suitable for achieving dense layers on substrates, in particular glass substrates. Dense aluminium oxide layers, which nevertheless contain many phase barriers, can, for example, be used as protective layer in fluorescent tubes. There, they serve firstly as mercury diffusion barrier and therefore have to be as dense as possible. A particularly broad particle distribution would lead to denser packing in the layer than would be possible in the case of monomodal or bimodal distributions. Secondly, the protective layer serves as selective UV reflector and therefore has to have very many phase boundaries for light scattering, which a dense single-phase layer does not achieve.

In a particularly advantageous embodiment, the aluminium oxide powder has a structure in which at least part of the aggregates have an aggregate structure and aggregate dimensions which correspond largely to those of a pyrogenic, aggregated aluminium oxide.

This means that the pyrogenic aluminium oxide powder has a structure in which the primary particles are grown together to form three-dimensional aggregates. The average primary particle size, for example determined by means of transmission electron microscopy (TEM), of such powders is usually from 10 to 20 nm.

Figure 2:
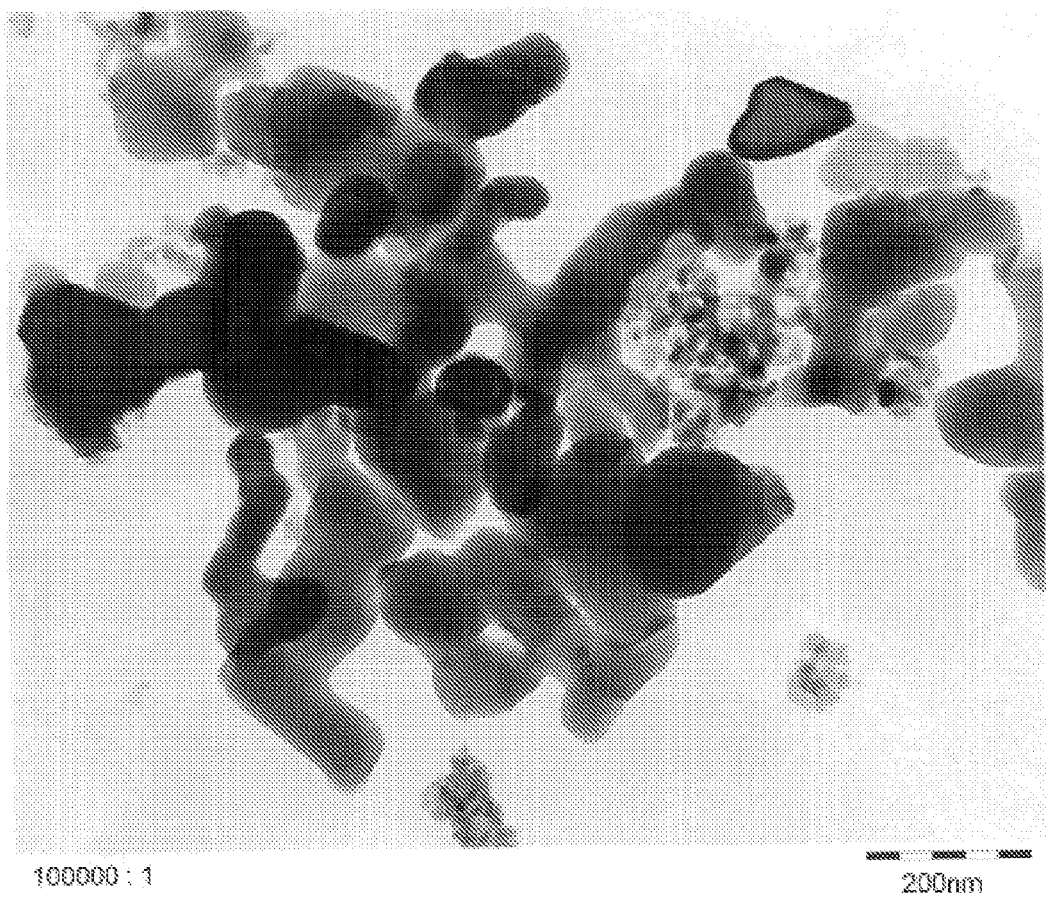

FIG. 2 shows a transmission electron micrograph of an aluminium oxide powder according to the invention on which not only relative coarse particles but also finer aggregate structures can be seen. These finer aggregate structures correspond largely to those of a pyrogenic aluminium oxide powder.

In a preferred embodiment, the aluminium oxide powder of the invention has a silicon dioxide content of less than 0.01% by weight.

The process for preparing the aluminium oxide powder of the invention, which is present in the form of aggregated primary particles having a BET surface area of from 3 to 30 $m^2/g$, preferably from 6 to 20 $m^2/g$, and in which the proportion of alpha-aluminium oxide is at least 85% by weight and the ratio $d_{90}/d_{10}$ of the weight distribution of the primary particles is at least 2.8, preferably from 2.8 to 3.5, is identical to the process already described above for preparing aluminium oxide powders having a high proportion of the alpha phase, with the proviso that the aluminium oxide powder used is pyrogenic.

The invention further provides for the use of the aluminium oxide powder or the aluminium oxide powder prepared by means of the process of the invention as constituent of fluorescent tubes, as abrasive, as raw material for engineering ceramics, in the ink-jet sector and for producing dispersions.

Particularly when used as raw material for engineering ceramics, the broad particle distribution of the aluminium oxide powder leads to a reduced shrinkage of the green body during sintering.

The invention further provides a mercury-containing fluorescent lamp containing an aluminium oxide powder prepared by means of the process of the invention or the aluminium oxide powder of the invention itself.

The mercury-containing fluorescent lamp preferably contains an aluminium oxide powder in the form of aggregated primary particles having a BET surface area of from 3 to 30 $m^2/g$, having a proportion of alpha-aluminium oxide of at least 85% by weight, where the ratio $d_{90}/d_{10}$ of the weight distribution of the primary particles is at least 2.8, preferably from 2.8 to 3.5, particularly preferably from 2.9 to 3.2. Here, a layer containing the aluminium oxide powder or consisting of the powder serves as barrier layer between the glass tubes of the lamp and the layer of fluorescent pigment ("phosphor"). The layer can be produced by using an aqueous or organic dispersion, optionally in the presence of one or more constituents selected from the group consisting of nonionic surfactants, cationic surfactants, binders such as polyvinyl alcohol or polyethylene oxide.

All further features of the fluorescent lamp are not subject to any restrictions. Thus, fluorescent lamps according to the invention can have any shape and size. The fluorescent pigments used can either come from the group of broad-band phosphors or comprise any mixtures of fluorescent pigments having a narrow spectral emission, including in the UV range. The electrical and electronic components of the fluorescent lamps of the invention are likewise not subject to any restrictions.

EXAMPLES

Example 1

Aluminium Oxide Powder

The pyrogenic aluminium oxide powder AEROXIDE® Alu C (BET surface area: 100 $m^2/g$, tamped density: 50 g/l, aluminium oxide content: ≥99.6% by weight), Evonik Degussa, is converted into flakes by means of a compactor L 200/50 P from Hosokawa BEPEX GmbH, equipped with a working width of 50 mm, preliminary deaeration and a 12 mm corrugated profile roller closed at the sides and made of hardened steel, with a pressing force of 10-20 kN, a speed of rotation of the roller of 4 revolutions per minute and a speed of rotation of the screw of 80 revolutions per minute.

The rod-shaped flakes obtained are crushed by means of a crushing machine (Frewitt MG-633) equipped with a sieve (size: 800 µm). After removal of the fines (<300 µm), stable fragments of flakes are obtained. For the present purposes, stable means that the fragments of flakes do not disintegrate prematurely during the subsequent heat treatment.

The fragments of flakes have a tamped density of 350 g/l and an average particle diameter of 240 µm.

These are subsequently heat treated at 1350° C. in a rotary tube furnace at a throughput of 2 kg/h and an average residence time of 14 minutes and then milled by means of an air jet mill.

The product obtained in this way has a proportion of aluminium oxide of ≥99.6% by weight, of alpha-aluminium oxide of more than 99.5% by weight. The content is determined by means of X-ray diffraction analysis by comparison with reference patterns. The proportion of silicon dioxide is less than 0.01% by weight, determined by means of X-ray fluorescence analysis.

Table 1 lists the properties of the aluminium oxide powder from Example 1 (A) and those of the comparative materials Ceralox APA 0.2 (B), from Sasol, Baikalox CR30F (C), from Baikowski, DH202299 (D), from Henan Xinxiang Jinsheng New materials Co, Ltd. and Baikalox CR6 (E), from Baikowski. FIG. 1 shows the cumulative curves of the weight distribution of the primary particles of the powders A to E.

$D_{10}$, $D_{50}$ and $D_{90}$ are defined as follows:

$D_{10}$: 10% by weight of the total mass of all particles has a particle diameter smaller than or equal to $D_{10}$.

$D_{50}$: 50% by weight of the total mass of all particles has a particle diameter smaller than or equal to $D_{50}$.

$D_{90}$: 90% weight of the total mass of all particles has a particle diameter smaller than or equal to $D_{90}$.

TABLE 1 properties of aluminium oxide powders

|  |  | A | B | C | D | E |
|---|---|---|---|---|---|---|
| alpha-$Al_2O_3$ | % by weight | >99.5 | <20 | 80 | 100 | 100 |
| BET | $m^2/g$ | 18 | 40 | 30 | 5 | 6 |
| Distribution |  | very broad | monomodal | bimodal | monomodal | broad |
| $D_{10}{}^{a)}$ | nm | 53.07 | 26.42 | 71.46 | 213.43 | 150.45 |
| $D_{50}{}^{a)}$ | nm | 113.25 | 41.16 | 86.63 | 266.86 | 254.25 |
| $D_{90}{}^{a)}$ | nm | 158.81 | 70.23 | 103.58 | 273.11 | 325.12 |
| $D_{90}/D_{10}$ |  | 2.99 | 2.66 | 1.45 | 1.28 | 2.16 |

$^{a)}$ determined by semiautomatic counting of transmission electron micrographs It can be seen that the aluminium oxide powder according to the invention has a very broad distribution compared to the powders B to E. The powder B which has a similarly high $D_{90}/D_{10}$ value contains only a small proportion of alpha-aluminium oxide. The powders C, D and E have a significantly narrower distribution and in addition display a significantly lower BET surface area.

FIG. 2 shows a transmission electron micrograph of the aluminium oxide powder according to the invention from Example 1. The aggregate structures and aggregate dimensions of the pyrogenic aluminium oxide powder AEROX-IDE® Alu C, Evonik Degussa, used can still clearly be seen.

Example 2

Dispersion 990 ml of deionized water are placed in a jacket-cooled 2 l dispersing vessel. While stirring by means of the toothed disc, 810 g of the aluminium oxide powder from Example 1 are added a spoonful at a time over a period of 15 minutes. After each 200 g of aluminium oxide powder, 4 g of half-concentrated acetic acid are added and at the end the pH is set to 4 by means of a little acetic acid. Dispersing is continued for a further 15 minutes by means of the toothed disc at 3000 rpm, and the mixture is then dispersed for a further 15 minutes by means of a fine dispersion rod (diameter: 4.5 cm) by means of an Ultraturrax (IKA) at 8000 rpm.

This gives a milky-white, fluid dispersion having a solids content of about 45%. The average aggregate size ($D_{50}$) was determined as 280 nm by means of static light scattering (Horiba LA-300).

Example 3

Coating of a Glass Surface 3 g of Polyox WSR-750 (high molecular weight polyethylene oxide, Dow Chemicals) are dissolved in 77 g of hot deionized water with stirring. After cooling, 20 g of the dispersion from Example 2 are added, likewise with stirring. The resulting formulation is applied by means of a doctor blade to glass surfaces. Drying at from 200 to 500° C. gives a firmly adhering, dense and opaque layer.

Example 4

Coating of the Interior Surface of a Glass Tube

A glass tube having an internal diameter 1.55 cm and a length of 50 cm is tilted at an angle of 30° to the horizontal and continually turned slowly by hand. The formulation from Example 3 is then allowed to trickle slowly through the glass tube and the excess is collected. After drying from 200 to 500° C., a firmly adhering, dense and opaque layer having a thickness of about 4 µm is obtained, analogously to Example 2. Other layer thicknesses can be achieved by varying the viscosity of the formulation, which is essentially a function of the solids content.

Example 5

Production of Fluorescent Lamps

To test the effectiveness of the mercury diffusion barrier, glass tubes which had been coated by a method analogous to Example 4 were used for producing fluorescent lamps. Lamp parameters were: 14 W, phosphor layer based on a white broad-band fluorescent pigment of the type $Ca_5(PO_4)_3(Cl, F):Sb^{3+}, Mn^{2+}$, filling gas: argon, mercury vapour pressure about 0.01 mbar.

5 such lamps were in each case produced under otherwise identical conditions using the aluminium oxide A from Example 1 (according to the invention; very broad particle size distribution) and the aluminium oxide type C (comparative example, narrow particle size distribution). The luminous flux was measured on a lamp test stand. Table 2 shows the luminous flux after 5 h, 100 h, 500 h and 1000 h.

TABLE 2

Luminous flux as a function of the aluminium oxide

|  | Aluminium oxide | |
|---|---|---|
| Luminous flux* | Type A | Type C |
| 5 h | 807.8 | 810.3 |
| 100 h | 766.6 | 758.0 |
| 500 h | 731.8 | 710.0 |
| 1000 h | 720.2 | 686.6 |

*In lm; average values

It can be seen that the luminous flux which results when using the aluminium oxide type A decreases to a significantly lesser extent with time than when type C is used. This can be explained by the better barrier action of the aluminium oxide layer.

The invention claimed is:

1. A process for process for preparing an aluminium oxide powder which is present in the form of aggregated primary particles and comprises at least 85% by weight of alpha-aluminium oxide, comprising:
   a) press granulating a pyrogenic aluminium oxide powder which is present in the form of aggregated primary particles into flakes, wherein the pyrogenic aluminium oxide powder is selected from the group consisting of gamma-aluminium oxide, theta-aluminium oxide, delta-aluminium oxide, X-ray amorphous aluminium oxide and mixtures thereof;
b) crushing the flakes to produce fragments, wherein the fragments have an average particle diameter of 300 to 800 μm and a tamped density of 300 to 800 g/l; and
c) heat treating the fragments at 1300 to 1500° C. and subsequently milling.

2. The process of claim 1, wherein the average residence time of the heat treatment is from 1 minute to 3 hours.

3. The process of claim 1, wherein the milling is dry milling.

4. The process of claim 1, wherein the pyrogenic aluminium oxide powder comprises gamma-aluminium oxide.

5. The process of claim 1, wherein the pyrogenic aluminium oxide powder comprises theta-aluminium oxide.

6. The process of claim 1, wherein the pyrogenic aluminium oxide powder comprises delta-aluminium oxide.

7. The process of claim 1, wherein the pyrogenic aluminium oxide powder comprises X-ray amorphous aluminium oxide.

8. The process of claim 1, wherein the powder has an aluminum oxide content of at least 99.8% by weight.

9. The process of claim 1, wherein the powder has an aluminum oxide content of at least 99.9% by weight.

* * * * *

UNITED STATES PATENT AND TRADEMARK OFFICE
CERTIFICATE OF CORRECTION

| | | |
|---|---|---|
| PATENT NO. | : 8,834,833 B2 | Page 1 of 1 |
| APPLICATION NO. | : 13/129070 | |
| DATED | : September 16, 2014 | |
| INVENTOR(S) | : Christian Schulze-Isfort et al. | |

It is certified that error appears in the above-identified patent and that said Letters Patent is hereby corrected as shown below:

On the title page, Item (87) the PCT Publication Information is incorrect. Item (87) should read:

--(87) PCT Pub. No.: WO2010/069690
PCT Pub. Date: Jun. 24, 2010--

Signed and Sealed this
Ninth Day of June, 2015

Michelle K. Lee
*Director of the United States Patent and Trademark Office*